United States Patent
Wang (10) Patent No.: US 9,571,675 B2
(45) Date of Patent: Feb. 14, 2017

(54) APPARATUS, METHOD AND COMPUTER PROGRAM PRODUCT FOR USING IMAGES IN CONTACT LISTS MAINTAINED IN ELECTRONIC DEVICES

(75) Inventor: Kongqiao Wang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 2344 days.

(21) Appl. No.: 11/824,030

(22) Filed: Jun. 29, 2007

(65) Prior Publication Data

US 2009/0006484 A1    Jan. 1, 2009

(51) Int. Cl.
| | | |
|---|---|---|
| G06F 17/30 | (2006.01) | |
| H04N 1/00 | (2006.01) | |
| H04M 1/2745 | (2006.01) | |
| H04N 1/32 | (2006.01) | |

(52) U.S. Cl.
CPC .... *H04N 1/00307* (2013.01); *G06F 17/30247* (2013.01); *H04M 1/27455* (2013.01); *H04N 1/0044* (2013.01); *H04N 1/00408* (2013.01); *H04N 1/00437* (2013.01); *H04N 1/32112* (2013.01); *H04M 1/274533* (2013.01); *H04N 2201/3205* (2013.01); *H04N 2201/3209* (2013.01); *H04N 2201/3247* (2013.01); *H04N 2201/3273* (2013.01)

(58) Field of Classification Search
CPC ............ H04N 1/00307; H04N 1/00437; H04N 2201/3205; H04N 2201/3273; H04N 2201/3209; H04M 1/27455; H04M 1/274533; G06F 17/30247
USPC ....... 382/115, 118, 180, 182, 217, 218, 219; 455/414.1, 414.2
See application file for complete search history.

(56) References Cited

U.S. PATENT DOCUMENTS

| | | | | |
|---|---|---|---|---|
| 7,327,882 | B2 * | 2/2008 | Wang et al. | 382/181 |
| 8,074,165 | B2 * | 12/2011 | Baldonado et al. | 715/230 |
| 2002/0111813 | A1 | 8/2002 | Capps | |
| 2002/0188602 | A1 * | 12/2002 | Stubler et al. | 707/3 |
| 2003/0179911 | A1 | 9/2003 | Ho et al. | 382/118 |
| 2004/0008258 | A1 | 1/2004 | Aas et al. | 348/207.1 |

(Continued)

FOREIGN PATENT DOCUMENTS

| | | |
|---|---|---|
| EP | 1 259 051 A1 | 5/2002 |
| JP | 20000003452 A | 1/2000 |

(Continued)

OTHER PUBLICATIONS

"Riya Visual Search", www.riya.com, 2005-2007, 1 pg.

*Primary Examiner* — Leslie Wong
(74) *Attorney, Agent, or Firm* — Harrington & Smith (57) ABSTRACT

An electronic device having a memory, a display, control apparatus and a data processor. When the data processor executes a program stored in the memory of the electronic device, the electronic device receives an image containing a person, the image further containing a face component, the face component containing the face of the person; displays the image on the display; locates the face component within the image; emphasizes the face component; receives image annotation information concerning the face component; and saves the image annotation information to the memory of the electronic device. The image annotation information may take the form of contact information for use in a contact database. A method uses the face component to locate other images in the database that also contain the person, and adds the annotation information to those images.

47 Claims, 5 Drawing Sheets

(56) References Cited

U.S. PATENT DOCUMENTS

| | | |
|---|---|---|
| 2004/0103101 A1 | 5/2004 | Stubler et al. ............... 707/100 |
| 2004/0190750 A1 | 9/2004 | Rodriguez et al. ........... 382/100 |
| 2004/0264780 A1* | 12/2004 | Zhang et al. ................. 382/224 |
| 2005/0219393 A1 | 10/2005 | Sugimoto ................. 348/333.01 |
| 2005/0280502 A1 | 12/2005 | Bell ............................ 340/5.83 |
| 2006/0148500 A1* | 7/2006 | Glenner et al. ............. 455/517 |
| 2007/0013769 A1 | 1/2007 | Lee et al. ................... 348/14.01 |
| 2007/0099602 A1 | 5/2007 | Kurlander et al. ........... 455/418 |
| 2008/0106621 A1* | 5/2008 | Jung et al. ................... 348/262 |
| 2008/0112604 A1* | 5/2008 | Lloyd .......................... 382/131 |
| 2008/0152201 A1* | 6/2008 | Zhang et al. ................ 382/118 |
| 2008/0235564 A1* | 9/2008 | Erol et al. .................... 715/202 |
| 2008/0298766 A1* | 12/2008 | Wen et al. ..................... 386/46 |

FOREIGN PATENT DOCUMENTS

| | | |
|---|---|---|
| KR | 20050067396 A | 7/2005 |
| WO | WO 03/079606 A1 | 9/2003 |
| WO | WO 2006/005666 A1 | 1/2006 |
| WO | WO 2007/011709 A2 | 1/2007 |

* cited by examiner

APPARATUS, METHOD AND COMPUTER PROGRAM PRODUCT FOR USING IMAGES IN CONTACT LISTS MAINTAINED IN ELECTRONIC DEVICES

TECHNICAL FIELD

The invention generally concerns methods and apparatus for managing contact lists and images in portable electronic devices, and more particularly concerns methods and apparatus for annotating images and for using annotated images in contact lists.

BACKGROUND

Wireless telephones that incorporate cameras are extremely popular. The ability to capture images with a camera, and to save them to a memory of a wireless telephone incorporating the camera, presents not only new opportunities for using the images to perform certain functions within the context of the wireless telephone, but also new challenges, as users are confronted with the necessity to organize the images.

Perhaps the most common use of cameras associated with wireless telephones is to take pictures of family members; friends; business colleagues; business acquaintances; etc., especially since wireless telephones are networking devices and are used to perform networking functions. Accordingly, many photographs likely to be found in the memories of wireless telephones will contain images of people. As memories of wireless telephones increase in capacity, ever increasing numbers of images will be stored in wireless telephones. As a result, those skilled in the art seek methods and apparatus that facilitate organization of images. In particular, those skilled in the art especially desire methods and apparatus that draw upon or enhance existing functionality to perform image organization operations.

In addition, those skilled in the art also recognize that photographs in conventional wireless telephones serve merely a keepsake or memento function. For example, a person viewing photographs stored in a wireless telephone cannot use the photographs to initiate a communication operation. Those skilled in the art seek methods and apparatus that use photographs in some way to improve the functionality of telephones, and perhaps, to provide a more natural interface for managing communication operations that operates as a supplement to existing text-based contact databases. Such functionality would be particularly helpful to those who meet many people in their business activities. Having access to "functional" photographs could assist such users in following up contacts after a busy trade show, for example, when names in a contact list may not be enough to stir a memory.

As a result, those skilled in the art are particularly concerned with finding new methods and apparatus that use the human component of images to assist in performing communication operations and image organization functions in, for example, a wireless telephone. For example, those skilled in the art are concerned with finding some way to use the human component of images to improve the functionality of contact databases often incorporated in wireless telephones, and possibly to supplement contact databases. In addition, those skilled in the art are more generally concerned with using the human component to improve image organization functionality in wireless telephones containing cameras and other image capture devices.

SUMMARY OF THE INVENTION

The foregoing problems are overcome, and other advantages are realized, in accordance with the following embodiments of the present invention.

A first embodiment of the invention is an electronic device comprising: a memory; a display device; control apparatus; and a data processor. The memory is configured to store an image database; an image annotation database; and at least one program configured to control the electronic device when executed. The display device is configured to display visual information. The control apparatus is configured to receive control commands from a user of the electronic device. The data processor is configured to execute the at least one program, wherein when the at least one program is executed the electronic device is configured to receive an image; to perform face detection on the image to locate face components; in response to detection of at least one face component containing a face of at least one person, to save image annotation information identifying the location of the face component within the image to the image annotation database; to present the image using the display to a user so that the at least one face component is emphasized; to receive additional image annotation information selected by the user, the additional image annotation information concerning the at least one person; and to save the additional image annotation information to the image annotation database.

A second embodiment of the invention is a computer program product comprising a computer readable memory tangibly embodying a computer program, the computer program executable by a data processor of an electronic device, wherein, when executed, the computer program is configured to cause the electronic device to receive an image; to perform face detection on the image to locate face components; in response to detection of at least one face component containing a face of at least one person, to save image annotation information identifying the location of the face component within the image to a database; to present the image using a display to a user so that the at least one face component is emphasized; to receive additional image annotation information selected by the user, the additional image annotation information concerning the at least one person; and to save the additional image annotation information to the database.

A third embodiment of the invention is a method comprising: receiving an image; performing face detection on the image to determine whether the image contains at least one face component; and in response to detection of at least one face component in the image, the at least one face component containing a face of at least one person, saving image annotation information identifying the location of the face component within the image to a database; presenting the image to a user in a manner so that the at least one face component is emphasized; receiving additional image annotation information selected by the user, the additional image annotation information concerning the at least one person; and saving to the database the additional image annotation information.

A fourth embodiment of the invention is an electronic device comprising: memory means for storing an image database; an image annotation database; and at least one program means for controlling the electronic device when executed; display means for displaying visual information;

control means for receiving control commands from a user of the electronic device; and data processor means for executing the program means, for receiving an image; for performing face detection on the image to locate face components; in response to detection of at least one face component containing a face of at least one person, for saving image annotation information identifying the location of the face component within the image to the image annotation database; for presenting the image using the display to a user so that the at least one face component is emphasized; for receiving additional image annotation information selected by the user using the control means, the additional image annotation information concerning the at least one person; and for saving the additional image annotation information to the image annotation database.

A fifth embodiment of the invention is a system comprising: a remote image database; a remote contact database; and a portable electronic device. The remote image database comprises a network interface configured to connect the remote image database to a network; and a memory configured to store images. The remote contact database comprises a network interface configured to connect the remote contact database to a network; and a memory configured to store contact information. The portable electronic device comprises a network interface; a memory; a display device; control apparatus; and a data processor. The network interface is configured to connect the portable electronic device to a network. The memory is configured to store an image database; an image annotation database; and at least one program configured to control the electronic device when executed. The display device is configured to display visual information. The control apparatus is configured to receive control commands from a user of the electronic device. The data processor is configured to execute the at least one program, wherein when the at least one program is executed the electronic device is configured to receive an image from at least one of the remote image database and the image database of the portable electronic device; to perform face detection on the image to locate face components; in response to detection of at least one face component containing a face of at least one person, to save image annotation information identifying the location of the face component within the image to at least one of the image annotation database of the portable electronic device or the remote contact database; to present the image using the display to a user so that the at least one face component is emphasized; to receive additional image annotation information selected by the user, the additional image annotation information concerning the at least one person; and to save the additional image annotation information to at least one of the image annotation database of the portable electronic device and the remote contact database.

In conclusion, the foregoing summary of the various embodiments of the present invention is exemplary and non-limiting. For example, one of ordinary skill in the art will understand that one or more aspects or steps from one embodiment can be combined with one or more aspects or steps from another embodiment to create a new embodiment within the scope of the present invention.

BRIEF DESCRIPTION OF THE DRAWINGS

In the attached Drawing Figures.

DETAILED DESCRIPTION OF EXEMPLARY EMBODIMENTS

The invention in exemplary methods, apparatus and computer program products concerns efficiently annotating human face images with contact information saved in contact databases, adding contact information annotated in face images to a contact database; and using annotated images to control communication operations.

Figure 1A:
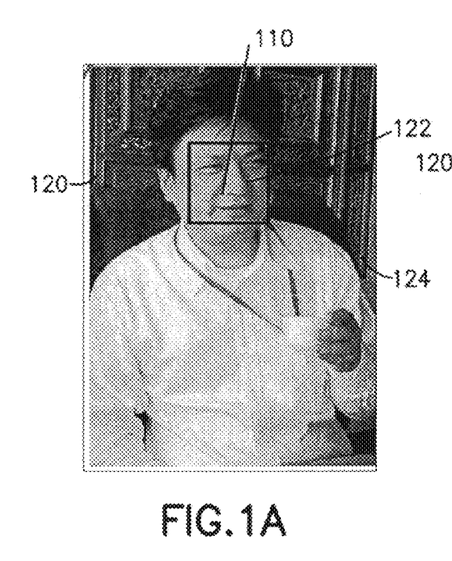
FIGS. 1A-C show a graphical user interface operating in accordance with the invention.

The invention in exemplary embodiments operates as follows. An image containing one or multiple faces is captured with a phone camera, or downloaded from a server, or received from a friend as a MMS. Then, face detection is performed on the input image. Face detection and recognition operations can be implemented with any face detection and recognition algorithms that are suitable for use in the relevant technical environment. For example, more complex face detection and recognition algorithms may be used in non-portable electronic devices implementing the invention. Less complex face detection and recognition algorithms may be implemented in portable electronic devices. In any case, face detection and recognition algorithms are well known to those skilled in the art. If a face is detected, it is set off in some way from the rest of the image, as depicted in FIG. 1, where a graphical component 110 has been used to distinguish the face component 122 from the remaining portion 124 of the image 120. In one embodiment, the invention performs face recognition to determine if contact information has already been created for the person depicted in the image. The invention accomplishes this by using the face component to search an image database for annotated images containing the same person, as depicted in FIG. 1C. Here, the same person as depicted in FIG. 1A has also been found in image 130 depicted in FIG. 1C. If an annotation (for example, contact information) has already been created for the person, the pre-existing annotation will be associated with the face component 122.

Figure 1B:
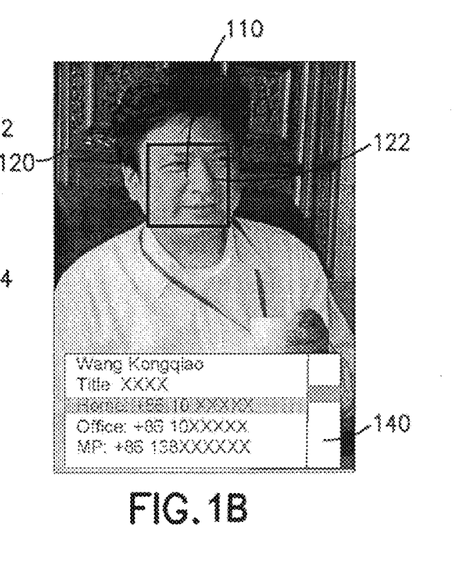
Figure 1C:
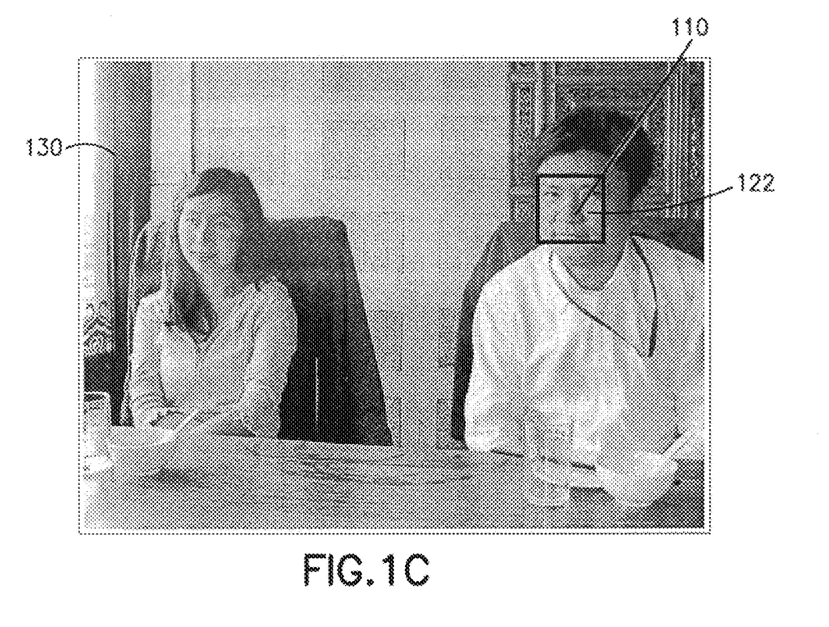

If no pre-existing annotation is found, an interactive graphical user interface 140 can be displayed as depicted in FIG. 1B to receive annotation information. Alternatively, a user can access a text-based contact database to locate annotation information for the image.

The annotation information can be added to an image in many ways within the context of the invention. In one embodiment, the contact information is stored as metadata in the picture. If privacy is a concern, the metadata may be encrypted so that only those authorized to use the image can access the metadata. Alternatively, the annotation information may be stored in another database (for example, a contact database) with a link to the image containing the face. In embodiments implemented in this manner, the annotation information will not follow the image when the image is forwarded, since it is not part of the image.

After one face component has been annotated in an image, the method will determine if there are additional faces in the image. If a second face is located, a face component containing at least a portion of the second face is specified. Then a search is performed of previously annotated face images to determine if an annotation has already been created for the person depicted in the second image. If so, the pre-existing annotation is used at least as a starting point to annotate the second face. If not, the interactive graphical user interface 140 appears so that the user can annotate the second image. The process continues until all the faces detected in the image have been annotated, or at least until all the face that the user desired to annotate have been annotated.

In a typical embodiment, the annotation information will comprise a contact for use in a contact database. In such an embodiment, the interactive interface 140 will appear superimposed on the face image to allow the end user to input the person's contacts as the face's annotation. As the end user inputs the person's name into the request box, the system in one variant of the invention will automatically search the contact database to see if the name is already saved in the contact database. If the name is in the phonebook, all the contact information associated with the person saved in the phonebook will be automatically transferred to the interactive interface. If no pre-existing annotation or contact information is located, the user can manually input the annotation information.

Again, as described previously, if no annotation is found associated with a pre-existing image, a user can search for annotation information in a text-based contact database and if such contact information is found, associate it with the image.

Once an image has been annotated (with, for example, contact information), in one embodiment of the invention the image can be used to initiate communication operations in a wireless telephone and other networking devices. Referring back again to the busy trade show attendee described previously, the attendee may not remember contacts well enough to match acquaintances to names in a text-based contact list. In such a situation, the attendee can review annotated images created during the trade show to stir his or her memory. Once an annotated image containing the desired person has been located, the user can launch communication operations from the image. This can be implemented in many ways within the context of the invention. For example, when an image is first displayed, icons may be momentarily superimposed over portions of images containing persons to indicate whether a communication operation can be launched to the persons contained in the image. Alternatively, a user can move a cursor over a portion of an image containing a person. If contact information has been created for that person, a pop-up indicator will appear when the position of the cursor coincides with the location of the person in the image, indicating a communication operation can be initiated targeting the person. If no pop-up indicator appears, then an annotation has not been created for the person, and a communication operation cannot be initiated targeting the person.

Figure 2:
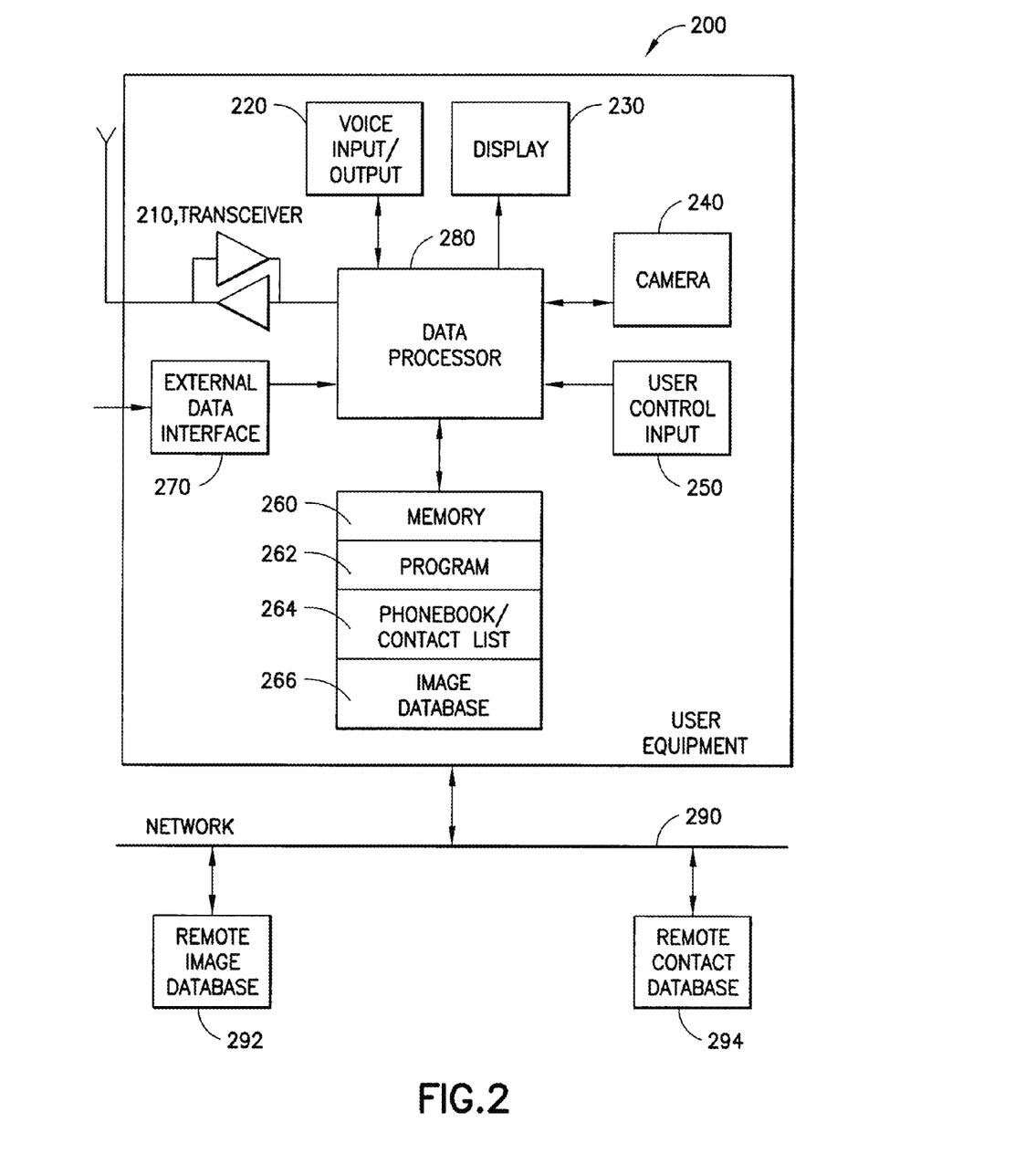
FIG. 2 is a conceptual block diagram depicting devices and a network environment in which exemplary embodiments of the invention may be practiced.

FIG. 2 depicts a portable electronic device 200 (in this example a user equipment operable in a wireless communications system) and remote databases 292, 284 in which exemplary embodiments of the invention may be practiced. The portable electronic device 200 comprises a transceiver 210 configured for bidirectional communications in a wireless communications network; voice input/output apparatus 220 (e.g., a transducer and a speaker); a display 230 (e.g., an LCD) for displaying information to the user of the portable electronic device; a camera 240 (e.g., a CCD or CMOS device) for capturing still images and possibly movies; a user control input 250 (e.g., a combination of a keyboard and other switchgear and/or a voice command interface); a memory 260 for storing at least a program 262 for controlling operation of the portable electronic device 200 and for performing operations in accordance with the invention; an external data interface 270 (e.g., one or both of a jack and a short-range wireless interface (e.g., Bluetooth) or other well-known input connections) for connecting the portable electronic device to an external source of data; and a processor 280.

The memory 260 may be of any type suitable to the local technical environment and may be implemented using any suitable data storage technology, such as semiconductor-based memory devices, magnetic memory devices and systems, optical memory devices and systems, fixed memory and removable memory. In addition, the memory of portable electronic device 200 may be implemented as a combination of two or more of the foregoing storage technologies.

As depicted, the memory 260 stores both a program 262 for controlling operations of the portable electronic device and, more specifically, for performing operations in accordance with the invention. The invention draws upon the availability of a phonebook/contact list 264 and image database 266, both stored in memory 260.

In general, embodiments of the invention may be implemented in UE 200 that comprise in exemplary and non-limiting examples cellular telephones; personal digital assistants (PDAs) having wireless communication capabilities; gaming devices; and internet appliances. The invention can also be implemented in desktop apparatus such as, for example, desktop computers operating in combination with external photographic devices, notebook computers; palm-top computers, etc.

The data processor 280 may also be of any type suitable to the local technical environment, and may include one or more of general purposes processors, special purpose processors, microprocessors, special-purpose computers, and processors based on a multi-core architecture, as non-limiting examples.

Also, the methods and apparatus of the invention may be implemented in a networked environment. For example, image annotation and contact information creation operations described herein performed by portable electronic device 200 may operate on images stored in a remote image database 292 and contact information stored in remote contact database 294, both accessed over network 290. Network 290 may represent a collection of networks, both wireless and wired, serving to connect portable electronic device to remote image database 292 and remote contact database 294.

Figure 3:
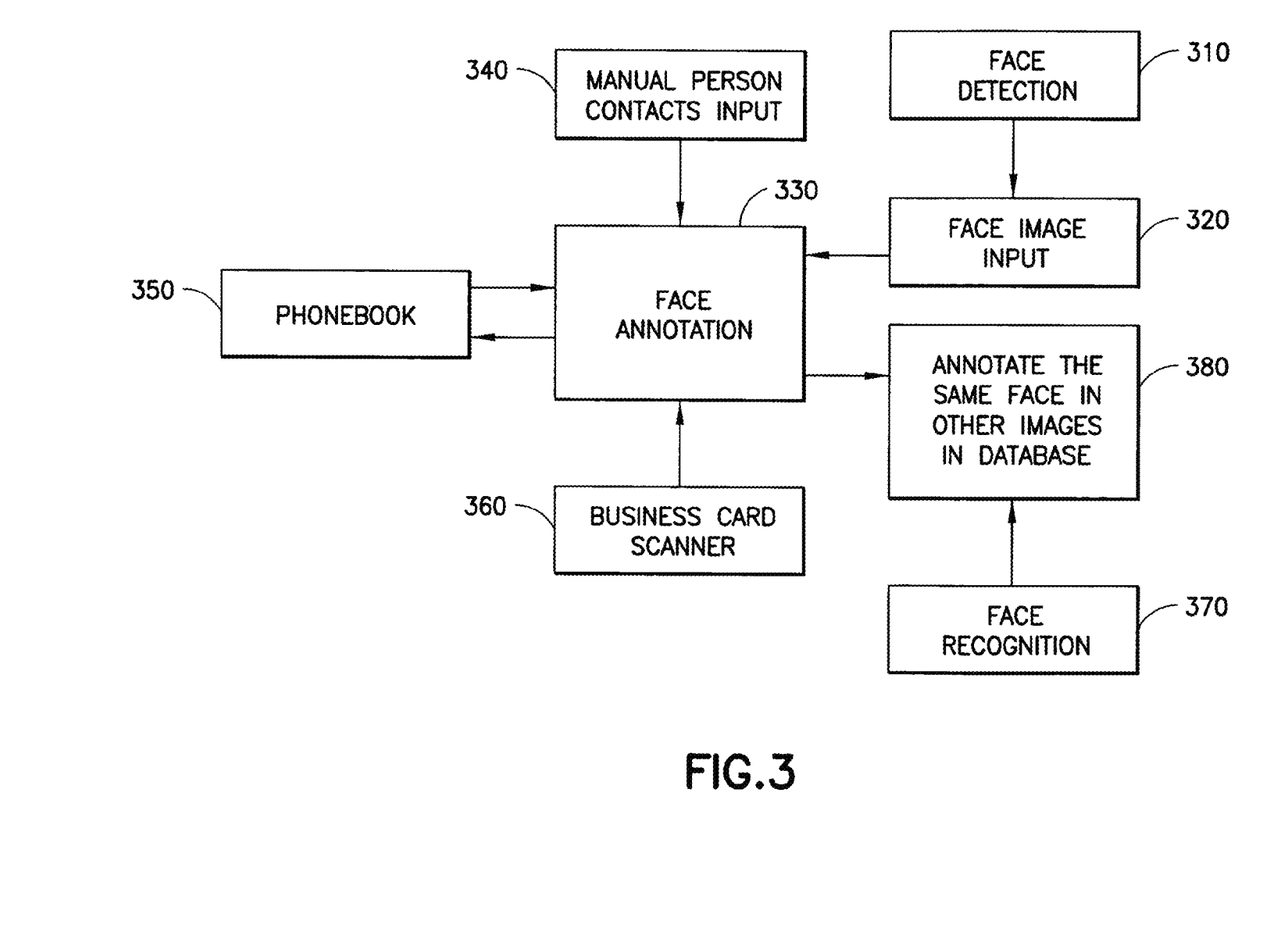
FIG. 3 is a conceptual flow chart summarizing operations performed in accordance with exemplary embodiments of the invention.

FIG. 3 is a conceptual block diagram summarizing various operations that are performed in accordance with methods of the invention. In one embodiment, the invention comprises a method for performing face detection and annotation of detected faces. This is represented by elements 310, 320 and 330 in combination with at least one of 340, 350 or 360. An image is accessed (or generated using, for example, camera 240 of portable electronic device 200). Face detection 310 is performed to identify each face in the image. Then, each face is presented to a user at face image input step 320. In an exemplary and non-limiting embodiment, this may comprise zooming the image so that the face to be annotated occupies the majority of the display. In alternate embodiments, this may be performed in other ways. For example, new images may be created for each face comprising a cropped portion of the image containing the face and minimal surrounding background imagery. In other embodiments the portion of the image surrounding the face component may be dimmed while the face component continues to be displayed normally. When reproduced on display 230 this has the effect of emphasizing the face, thereby simplifying annotation operations. As indicated previously, the actual annotation operations may be performed in several ways. In a first embodiment 340, the annotation information may be manually provided by a user entering annotation information with, for example, a face annotation graphical user interface. In a second embodiment, a user can employ pre-existing contact information already present in electronic database such as, for example, in phonebook 350. In this embodiment, the user can access a phonebook entry with appropriate key strokes. The entry then is presented to the user in a graphical user interface. If at the time of matching the image to the phonebook entry the user wants to update the contact information in the phonebook, the user can do so while the contact information is displayed in the graphical user interface. In a third embodiment, the user can annotate the face image with the assistance of a business card scanner 360. While the image to be annotated is displayed on a display, the user can access an internal or external business card scanner apparatus. Once accessed, the user can scan the business card of the person in the image. Optical character recognition will be performed to capture the text data in the business card, and the text data will be displayed in a graphical user interface so the user can proof the information and possibly edit or amend the information.

In another method summarized in FIG. 3, an annotated face image can be used to add annotations to other images in an image database. In this aspect of the invention, the user selects from an annotated image database an annotated image. The user then commands the electronic device to access an image database to find other images with the same person as in the annotated image. This step is performed through face recognition 370. Once images containing the same person have been identified face annotation 330 is performed to annotate 380 the same face in other images in the database. Typically, this will be done automatically using the annotation already created for the annotated image. Nonetheless, it is within the scope of the present invention that any of the methods described with respect to elements 340, 350 and 360 can be used to add annotations to the other images in the image database.

Figure 4:
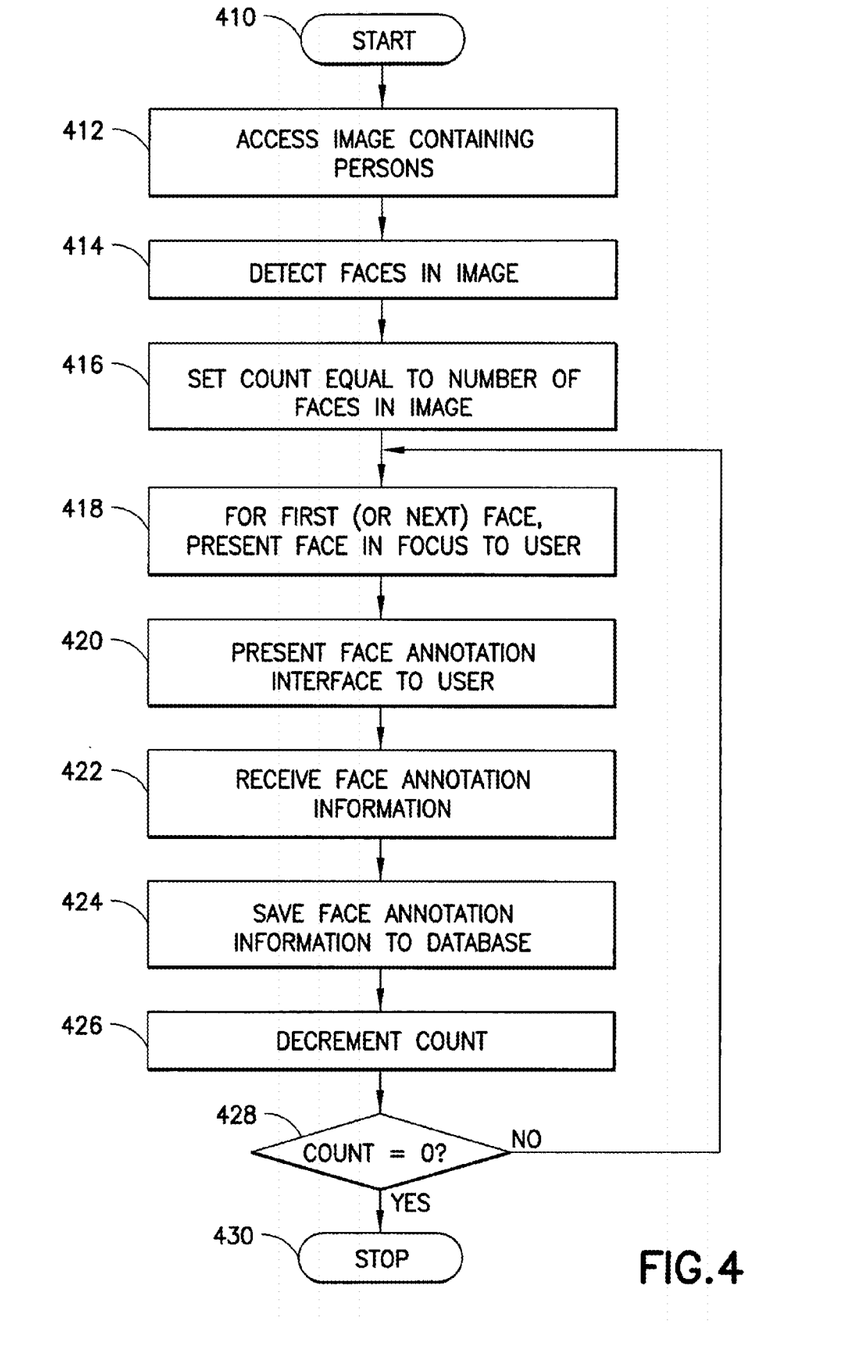
FIG. 4 is a flow chart depicting a method operating in accordance with the invention.

FIG. 4 is a flowchart depicting a method operating in accordance with the invention. The method starts at 410. Next, a portable electronic device 200 such as that depicted in FIG. 2 executes a program for performing steps of the method with, for example, data processor 280. Then, at 412, an image is accessed, the image containing likenesses of several persons. Next, at 414, the data processor 280 executes instructions that perform face detection on faces contained in the image. Then, at 416, a count is set equal to the number of faces in the image. The count controls the iterative aspects of the invention wherein each face detected in the image is annotated in turn. Next, at 418, the first (or next) face detected in the image is presented in zoomed, cropped or otherwise emphasized form to a user of portable electronic device 200 using display 230. Then, at 420, a face annotation interface is presented to the user. The face annotation interface may comprise a drop down menu with several pre-defined data categories such as, for example, name, address, telephone number, e-mail address, etc. Next, at 422, the portable electronic device 200 receives face annotation information entered with the face annotation interface. Then, at 424, the face annotation information is associated with the image and saved to the memory 260 of portable electronic device 200. The face annotation information includes information identifying the associated image, so that the associated image and face annotation information can be recalled together to, for example, perform editing functions. Next, after completing the face annotation operations, the portable electronic device 200 decrements the count at 428 and reaches a decision point. If the count is equal to zero, the method ends. If the count is not equal to zero, that means an additional face or faces remain to be annotated so the method returns to step 418 to iterate until all of the faces have been annotated.

In one variant of the method depicted in FIG. 4 the annotation information comprises at least contact information for use in a contact database. In another variant of the method depicted in FIG. 4 the face component is emphasized with a graphical component, the graphical component serving to distinguish the face component from the remaining portion of the image.

In a further variant of the method depicted in FIG. 4 the instructions that perform face detection may operate according to automatic face detection algorithms operating in accordance with the invention. Alternatively, the instructions may implement an interactive system that allows a user to select the desired face component within the image using, for example, user control input 250 of portable electronic device 200.

In yet another variant of the method depicted in FIG. 4, information identifying the location of the face or faces within the image is saved to a database. In a still further variant, a unique identifier is generated for each person added to the contact database, and the unique identifier is used to identify face components in images corresponding to the particular person. This allows images containing the particular person to be quickly located in response to, for example, a user query.

In a still further variant of the method depicted in FIG. 4, once a face has been located in an image and has been selected for annotation purposes, the method may perform an automatic search for previously annotated images contained in an image database to determine if an annotation has already been created for the person owning the face currently being annotated. If a likely match is found, a confirmation step may be performed to allow a user to indicate whether the likely match corresponds, in fact, to the person whose face is currently being annotated. If the match is good, then pre-existing annotation information associated with the previously annotated image is automatically displayed in an interactive graphical user interface superimposed over the face image currently being annotated. If the user desires, the user can adopt the pre-existing annotation for use with the face image currently being annotated. Alternatively, the user can edit the pre-existing annotation information to customize the annotation for the face image currently being annotated.

In another embodiment of the invention, whenever the user enters contact information into an interactive interface, the device performing the method can perform steps to assist the user in completing the annotation. For example, an annotation database can be continually searched as annotation information is entered to determine if there is a pre-existing annotation (e.g., contact information for the person whose face is being annotated) that forms a partial match with the annotation information being entered. If so, the complete pre-existing annotation is automatically recalled and displayed in the interactive graphical user interface. The user is then given the opportunity to adopt the pre-existing annotation "as is", or to amend it for use with the face image currently being annotated.

In further variants of the method depicted in FIG. 4, image annotation and image annotation synchronization operations may be performed using a database external to an electronic device performing the steps of the method. For example, in one variant, the image annotation operations may be performed on an image stored in a remote database. In current business and even home environments, media (including photographs) are often stored in a so-called media hub (e.g., a networked hard drive). Since the images in the media hub are accessible over a network, once annotated, they can still perform communication operation initiation functions. In such variants, the contact information needed to initiate a communication operation (such as, for example, a telephone call or text messaging session) will be uploaded from the remote database along with the image.

In another variant, when a face image is selected for annotation purposes, the external database may be searched in the manner described above to determine if an annotated image in the external database already contains a face image containing a person corresponding to the person in the face image currently being annotated. If so, the annotation for the image in the external database may be used either as is, or in an amended form, to annotate the image. In a further variant, once a face image has been annotated in the manner described in FIG. 4, the external database may be searched to locate images containing the same person as contained in the face image that has been annotated. The annotation for the face image then may be added to the images located in the external database.

Figure 5:
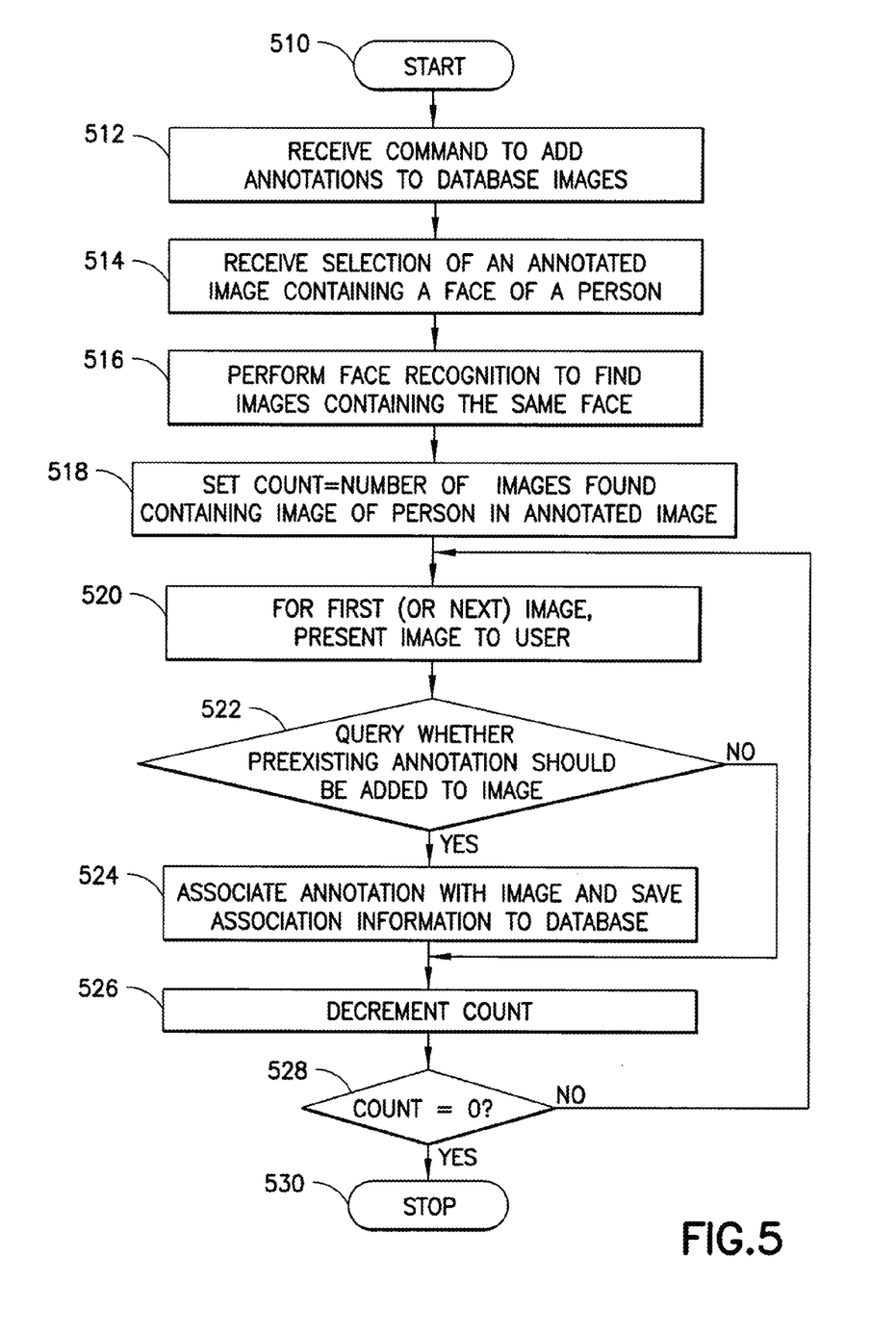
FIG. 5 is a flow chart depicting another method operating in accordance with the invention.

FIG. 5 is another flowchart depicting a method operating in accordance with an exemplary embodiment of the invention. The method can be implemented in a portable electronic device 200 like that depicted in FIG. 2, and will be described with reference to the portable electronic device 200. One of ordinary skill in the art will understand, though, that the method can be implemented in other devices having similar or different combinations of features to those depicted and described with respect to the portable electronic device 200 of FIG. 2. Accordingly, the method starts at 510. Next, at 512, the portable electronic device 200 receives command entered with user input control 250 to add annotations to pre-existing database images stored in image database 266 of memory 260. Then, at step 514, the portable electronic device 200 receives a selection of an annotated face image with user input control 250. This may happen immediately after the annotated face image has been created, or sometime thereafter when the user decides it is useful to annotate other images in the image database 266 of the portable electronic device 200. Next, at 516 the data processor 280 of portable electronic device 200 executes program instructions that perform face recognition to identify images that contain the same person (and face) as the annotated face image. After all the images have been located (it is expected that this step may be performed imperfectly), iterative confirmation/annotation operations are performed.

First, the data processor 280 of portable electronic device 200 executes program instructions at 518 that set a count equal to the number of images located that are suspected to contain the face of the same person as that depicted in the annotated face image. Then, at 520, the first (or next) image is presented to the user. The portable electronic device 200 then executes program instructions that present a query at 522 to the user with an interactive interface of the electronic device 200 (the user may interact with the interface through voice commands entered with voice input/output 220 or through keystrokes entered with user control input 250). The query presents the user with an alternative—should the pre-existing annotation already associated with the annotated image also be associated with the image currently being presented to the user? This step performs validation as well as annotation since the portable electronic device may have selected an image in error (the current image may not contain the person shown in the selected image with the pre-existing annotation). Alternatively, the user may decide not to add the pre-existing annotation to an image even though the image does contain the person depicted in the image with the pre-existing annotation. In either case, the decision at 522 is "no" and the method continues to 526 where the count is decremented. Then, the method continues at 528 where another decision point is reached. If the count is now equal to zero, the method stops at 530. If the count is not equal to zero, the method returns to 520; here the next image is presented to the user.

If the user decides to add an annotation to the image currently being presented at 522, the data processor 280 of portable electronic device 200 executes program instructions at 524 that create an association between the current image and the annotation, and save the association to memory 260 of the portable electronic device 200 so that the image and annotation can be recalled at a later time. In alternative embodiments, the user may be given the opportunity to edit the pre-existing annotation. This may be of particular use since the user may want to add a description of the circumstances in which the particular image was taken. The method then continues at 526, where the count is decremented. If the count is determined to be zero at 528, the method stops at 530. If not, the method returns to 520 to continue iterating until all the images have been annotated.

In another variant, the user need not indicate that the annotation be added to other images identified as containing the same person. Instead, the user can indicate that the annotation be added to all images identified as containing the person. This may save time when there tens or hundreds of photos containing the same person.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representations, it is well understood that these blocks, apparatus, systems, techniques or methods described herein may be implemented in, as non-limiting examples, hardware, software, firmware, special purpose circuits or logic, general purpose hardware or controller or other computing devices, or a combination thereof.

As such, it should be appreciated that at least some aspects of the exemplary embodiments of the invention may be practiced in various components such as integrated circuit chips and modules. The design of integrated circuits is by and large a highly automated process. Complex and powerful software tools are available for converting a logic design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

One of ordinary skill in the art will understand that methods depicted and described herein can be embodied in a computer program storable in a tangible computer-readable memory medium. Instructions embodied in the tangible computer-readable memory medium perform the steps of the methods when executed. Tangible computer-readable memory media include, but are not limited to, hard drives, CD- or DVD ROM, flash memory storage devices or in a RAM memory of a computer system.

Thus it seen that the foregoing description has provided by way of exemplary and non-limiting examples a full and informative description of the best method and apparatus presently contemplated by the inventors for managing contacts and images with face annotation information. One skilled in the art will appreciate that the various embodiments described herein can be practiced individually; in combination with one or more embodiments described herein; or in combination with apparatus differing from those described herein. Further, one skilled in the art will appreciate that the present invention can be practiced by other than the described embodiments; that these described embodiments are presented for the purposes of illustration and not of limitation; and that the present invention is limited only be the claims which follow.

What is claimed is:

1. An electronic device comprising:
   at least one memory configured to store an image database; an image annotation database; and at least one program configured to control the electronic device when executed;
   at least one display device configured to display visual information;
   control apparatus configured to receive control commands from a user of the electronic device; and
   at least one data processor configured to execute the at least one program, wherein when the at least one program is executed the electronic device is configured to receive an image; to perform face detection on the image to locate face components; in response to detection of at least one face component containing a face of at least one person, to save image annotation information identifying the location of the face component within the image to the image annotation database; to present the image using the display to a user so that the at least one face component is emphasized; to receive additional image annotation information selected by the user, the additional image annotation information concerning the at least one person; and to save the additional image annotation information to the image annotation database; and to allow the user to launch communication operations from the image in response to an image being annotated with annotation information, wherein when an image is first displayed, an icon is superimposed over a portion of the image containing a person to indicate whether a communication operation can be launched to the person contained in the image, and in response to an annotation that has not been created for the person, a communication operation cannot be initiated targeting the person.

2. The electronic device of claim 1 where the additional image annotation information comprises contact information.

3. The electronic device of claim 1 wherein to present the image to the user so that the at least one face component is emphasized further comprises to set off the face component with a graphical component when displaying the at least one image, the graphical component serving to distinguish the at least one face component from the remaining portion of the image.

4. The electronic device of claim 1 wherein to present the image to the user so that the at least one face component is emphasized further comprises to zoom the image when displaying the image so that the at least one face component occupies substantially all of the display.

5. The electronic device of claim 1 where the at least one program comprises face detection instructions that perform automated face detection when executed and wherein to perform face detection on the image further comprises to execute the face detection instructions so that automated face detection is performed on the image.

6. The electronic device of claim 1 where the at least one program comprises face component identification instructions that perform user-directed face component identification when executed and wherein to perform face detection on the image further comprises to execute the face component identification instructions; and to receive user commands entered with the control apparatus specifying the location of the face component within the image.

7. The electronic device of claim 1 wherein the at least one program comprises face recognition instructions and wherein when the face recognition instructions are executed the electronic device is further configured to search the image database using the at least one face component for other images containing the at least one person; and to save information to the at least one memory identifying other images containing the at least one person.

8. The electronic device of claim 7 wherein when the face recognition instructions are executed the electronic device is further configured to perform validation operations wherein the images located by the face recognition instructions using the face component are presented to the user to validate that the images do, in fact, contain the at least one person; and to save information to the at least one memory identifying other images containing the at least one person only for images validated by the user as containing the at least one person.

9. The electronic device of claim 7 wherein when the at least one program is executed the electronic device is further configured to detect the location of face components in the other images containing the at least one person; and to save to the image annotation database image annotation information identifying the locations of the face components in the other images.

10. The electronic device of claim 1 where when the at least one program is executed the electronic device is further configured to assign a unique identifier to the at least one face component, wherein the unique identifier is used to identify only face components containing the face of the at least one person.

11. The electronic device of claim 1 wherein when the at least one program is executed the electronic device is further configured to display an interactive graphical user interface for receiving annotation information; and wherein to receive additional image annotation information selected by a user further comprises to receive commands entered with the control apparatus specifying the additional image annotation information concerning the face component; and to display the additional image annotation information in the interactive graphical user interface.

12. The electronic device of claim 11 wherein when the at least one program is executed the electronic device is further configured to compare the additional image annotation information entered with the control apparatus to annotation information pre-existing in the image annotation database as the additional image annotation information is entered with the control apparatus; and, if a likely match is found, to display the likely matching annotation information pre-existing in the image annotation database in the interactive graphical user interface.

13. The electronic device of claim 12 wherein when the at least one program is executed the electronic device is further configured to present a choice to the user to confirm that the likely matching pre-existing annotation information is, in fact, a correct match for the face component; and to receive a response from the user identifying the likely matching pre-existing annotation information as a correct match.

14. The electronic device of claim 1 where the additional image annotation information is pre-existing in the at least one memory prior to receipt of the image containing the at least one person, and wherein to receive additional image annotation information further comprises to receive at least one command identifying the pre-existing additional image annotation information as concerning the face component.

15. The electronic device of claim 14 where the pre-existing additional image annotation information comprises a contact entry in a contact database.

16. The electronic device of claim 14 wherein to receive additional image annotation information further comprises to present the pre-existing additional image annotation information to the user in an interactive graphical user interface; to receive edits to the pre-existing additional image annotation information, creating edited annotation information; and to replace the pre-existing additional image annotation information with the edited information.

17. The electronic device of claim 1 further comprising an image capture device configured to capture images.

18. The electronic device of claim 17 wherein the image capture device is a camera.

19. The electronic device of claim 1 further comprising a business card scanner configured to capture text information from a business card, and wherein when the at least one program is executed the electronic device is further configured to receive annotation information concerning the face component located in the image from the business card scanner.

20. The electronic device of claim 1 further comprising a network interface, and wherein the when the at least one program is executed the electronic device is further configured to communicate with an external database over the network interface and to perform image and image annotation synchronization operations with the external database.

21. A computer program product comprising a non-transitory computer readable memory tangibly embodying a computer program, the computer program executable by a data processor of an electronic device, wherein, when executed, the computer program is configured to cause the electronic device to receive an image; to perform face detection on the image to locate face components; in response to detection of at least one face component containing a face of at least one person, to save image annotation information identifying the location of the face component within the image to a database; to present the image using a display to a user so that the at least one face component is emphasized; to receive additional image annotation information selected by the user, the additional image annotation information concerning the at least one person; and to save the additional image annotation information to the database; and to allow the user to launch communication operations from the image in response to an image being annotated with annotation information, wherein when an image is first displayed, an icon is superimposed over a portion of the image containing a person to indicate whether a communication operation can be launched to the person contained in the image, and in response to an annotation that has not been created for the person, a communication operation cannot be initiated targeting the person.

22. The computer program product of claim 21 wherein the computer program, when executed, is further configured to cause the electronic device to compare the at least one face component located in the image to annotated face components already in the database to determine if annotation information already exists for the at least one person; and, if a likely match is found between the face component in the image and an annotated face component already in the database, to load an interactive interface with annotation information associated with the annotated face component already in the database.

23. The computer program product of claim 22 wherein the computer program, when executed, is further configured to cause the electronic device to provide the user with an opportunity to confirm that the annotation information associated with annotated face component already in the database is a correct match and should be associated with the face component located in the image.

24. The computer program product of claim 21 wherein to present the image using a display so that the at least one face component is emphasized further comprises to set off the face component with a graphical component when displaying the at least one image, the graphical component serving to distinguish the face component from the remaining portion of the image.

25. The computer program product of claim 21 wherein to present the image using a display so that the at least one face component is emphasized further comprises to zoom the image when displaying the image so that the face component occupies substantially all of the display.

26. The computer program product of claim 21 wherein to perform face detection on the image further comprises to execute automatic face detection instructions that automatically locate face components within images.

27. The computer program product of claim 21 where to perform face detection on the image further comprises to receive user commands entered with control apparatus of the electronic device specifying a location of the face component within the image.

28. The computer program product of claim 21 wherein, when executed, the computer program is further configured to cause the electronic device to search an image database using the face component to locate other images containing the at least one person; and to save information to a memory of the electronic device identifying other images containing the at least one person.

29. The computer program product of claim 28 wherein, when executed, the computer program is further configured to cause the electronic device to associate the annotation information received for the face component located in the image with other images identified as containing the at least one person.

30. The computer program product of claim 28 wherein, when executed, the computer program is further configured to cause the electronic device to perform validation operations wherein the other images located in the database as also containing the at least one person are presented to the user to validate that the images do, in fact, contain the at least one person; and to save information to the memory of the electronic device identifying other images containing the at least one person only for images validated by the user as containing the at least one person.

31. The computer program product of claim 21 wherein the additional image annotation information comprises contact information for use in a contact database.

32. The computer program product of claim 21 wherein the computer program, when executed, is further configured to assign a unique identifier to the face component, the unique identifier used to identify only face components containing the face of the at least one person.

33. The computer program product of claim 21 wherein to receive additional image annotation information selected by a user further comprises to display an interactive graphical user interface for use by the user to enter the additional image annotation information.

34. The computer program product of claim 33 wherein the computer program, when executed, is further configured to cause the electronic device to compare the additional image annotation information entered with interactive graphical user interface to image annotation information pre-existing in the database as the additional image annotation information is entered with the interactive graphical user interface; and, if a likely match is found, to display the likely matching annotation information pre-existing in the database in the interactive graphical user interface.

35. A method comprising:
   performing the following by a portable electronic device:
   receiving an image;
   performing face detection on the image to determine whether the image contains at least one face component;
   and in response to detection of at least one face component in the image, the at least one face component containing a face of at least one person,
   saving image annotation information identifying the location of the face component within the image to a database;
   presenting the image to a user so that the at least one face component is emphasized;
   receiving additional image annotation information selected by the user, the additional image annotation information concerning the at least one person;
   saving to the database the additional image annotation information;
   allowing the user to launch communication operations from the image in response to an image being annotated with annotation information, wherein when an image is first displayed, an icon is superimposed over a portion of the image containing a person to indicate whether a communication operation can be launched to the person contained in the image, and in response to an annotation that has not been created for the person, a communication operation cannot be initiated targeting the person.

36. The method of claim 35 wherein the additional image annotation information comprises contact information.

37. The method of claim 35 further comprising:
   assigning a unique identifier to the at least one face component, the unique identifier indicating the identity of the at least one person; and
   saving to the database the unique identifier.

38. The method of claim 37 wherein the image and face component, respectively, further comprise a first image and a first face component, the method further comprising:
   receiving a second image containing the at least one person, the second image comprising at least a second face component, the second face component containing the face of the at least one person;
   locating the second face component within the second image; and
   saving image annotation information identifying the location of the second face component within the second image to the database.

39. The method of claim 38 further comprising:
   assigning the unique identifier to the second face component; and
   saving the assignment of the unique identifier to the second face component to the database.

40. The method of claim 39 further comprising:
   receiving a query to locate images containing the at least one person; and
   using the unique identifier to locate the first and second images.

41. The method of claim 35 where performing face detection on the image further comprises using an automated face detector to detect the at least one face component within the image.

42. The method of claim 35 where performing face detection on the image further comprises receiving user input specifying a location of the face component within the image.

43. The method of claim 35 wherein receiving additional image annotation information entered by a user further comprises:
   presenting an interactive user interface to the user, the interactive user interface configured to receive the additional image annotation information; and
   receiving the additional image annotation information entered with the interactive user interface.

44. The method of claim 35 where the additional image annotation information is pre-existing in the database prior to receipt of the image containing the at least one person, and wherein receiving additional image annotation information selected by the user further comprises:
   receiving at least one command identifying the pre-existing additional image annotation information as concerning the at least one face component.

45. The method of claim 44 wherein receiving additional image annotation information selected by the user further comprises:
   presenting the pre-existing additional image annotation information to the user in an interactive graphical user interface;
   receiving edits to the pre-existing additional image annotation information, creating edited annotation information; and
   replacing the pre-existing additional image annotation information with the edited annotation information.

46. An electronic device comprising:
   means for storing an image database; an image annotation database; and at least means for controlling the electronic device when executed;
   means for displaying visual information;
   means for receiving control commands from a user of the electronic device; and
   means for executing the means for controlling the electronic device when executed, for receiving an image; for performing face detection on the image to locate face components; in response to detection of at least one face component containing a face of at least one person, for saving image annotation information identifying the location of the face component within the image to the image annotation database; for presenting the image using the display to a user so that the at least one face component is emphasized; for receiving additional image annotation information selected by the user using the control means, the additional image annotation information concerning the at least one person; for saving the additional image annotation information to the image annotation database; and for allowing the user to launch communication operations from the image in response to an image being annotated with annotation information wherein when an image is first displayed, an icon is superimposed over a portion of the image containing a person to indicate whether a communication operation can be launched to the person contained in the image, and in response to an annotation that has not been created for the person, a communication operation cannot be initiated targeting the person.

47. A system comprising:
a remote image database comprising:
a network interface configured to connect the remote image database to a network; and
a memory configured to store images;
a remote contact database comprising:
a network interface configured to connect the remote image database to a network; and
a memory configured to store contact information; and
a portable electronic device comprising:
a network interface configured to connect the portable electronic device to a network;
at least one memory configured to store an image database; an image annotation database; and at least one program configured to control the electronic device when executed;
at least one display device configured to display visual information;
control apparatus configured to receive control commands from a user of the electronic device; and
at least one data processor configured to execute the at least one program, wherein when the at least one program is executed the electronic device is configured to receive an image from at least one of the remote image database and the image database of the portable electronic device; to perform face detection on the image to locate face components; in response to detection of at least one face component containing a face of at least one person, to save image annotation information identifying the location of the face component within the image to at least one of the image annotation database of the portable electronic device or the remote contact database; to present the image using the display to a user so that the at least one face component is emphasized; to receive additional image annotation information selected by the user, the additional image annotation information concerning the at least one person; and to save the additional image annotation information to at least one of the image annotation database of the portable electronic device and the remote contact database; and to allow the user to launch communication operations from the image in response to an image being annotated with annotation information, wherein when an image is first displayed, an icon is superimposed over a portion of the image containing a person to indicate whether a communication operation can be launched to the person contained in the image, and in response to an annotation that has not been created for the person, a communication operation cannot be initiated targeting the person.

* * * * *